(12) United States Patent
Chi et al.

(10) Patent No.: US 11,316,190 B2
(45) Date of Patent: Apr. 26, 2022

(54) BATTERY MODULE, AND BATTERY PACK AND VEHICLE COMPRISING SAME

(71) Applicant: LG CHEM, LTD., Seoul (KR)

(72) Inventors: Ho-June Chi, Daejeon (KR);
Kyung-Mo Kim, Daejeon (KR);
Jeong-O Mun, Daejeon (KR);
Jin-Yong Park, Daejeon (KR);
Jung-Hoon Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 177 days.

(21) Appl. No.: 16/619,408

(22) PCT Filed: Jan. 3, 2019

(86) PCT No.: PCT/KR2019/000103
§ 371 (c)(1),
(2) Date: Dec. 4, 2019

(87) PCT Pub. No.: WO2019/139302
PCT Pub. Date: Jul. 18, 2019

(65) Prior Publication Data
US 2020/0127318 A1  Apr. 23, 2020

(30) Foreign Application Priority Data
Jan. 12, 2018  (KR) .................. 10-2018-0004408

(51) Int. Cl.
*H01M 10/04* (2006.01)
*B23K 31/02* (2006.01)
*H01M 50/20* (2021.01)

(52) U.S. Cl.
CPC ......... *H01M 10/0481* (2013.01); *B23K 31/02* (2013.01); *H01M 50/20* (2021.01); *H01M 2220/20* (2013.01)

(58) Field of Classification Search
CPC ............ B23K 31/02; H01M 10/0468; H01M 10/0481; H01M 2220/20; H01M 50/20; Y02E 60/10; Y02P 70/50
See application file for complete search history.

(56) References Cited

U.S. PATENT DOCUMENTS

2012/0214046 A1  8/2012 Lim
2013/0022857 A1  1/2013 Meintschel et al.
(Continued)

FOREIGN PATENT DOCUMENTS

CN       104300171 A    1/2015
JP       2004-63383 A   2/2004
(Continued)

OTHER PUBLICATIONS

International Search Report (PCT/ISA/210) issued in PCT/KR2019/000103, dated May 24, 2019.
(Continued)

*Primary Examiner* — Victoria H Lynch
(74) *Attorney, Agent, or Firm* — Birch, Stewart, Kolasch & Birch, LLP (57) ABSTRACT

Discussed is a battery module that includes: at least one battery cell; a pair of pressing plates respectively disposed at opposite side surfaces of the at least one battery cell; and a module cover coupled to the pair of pressing plates to cover an upper side and a lower side of the at least one battery cell, wherein opposite ends of the module cover are bent by a bending to cover an upper end and a lower end of the pair of pressing plates, are welded to the pair of pressing plates, and include a plurality of auxiliary welding beads spaced apart from each other by a predetermined distance along a longitudinal direction of the module cover.

11 Claims, 5 Drawing Sheets

(56) References Cited

U.S. PATENT DOCUMENTS

| | | | |
|---|---|---|---|
| 2013/0022859 A1* | 1/2013 | Lim | H01M 10/0585 |
| | | | 429/159 |
| 2015/0024260 A1 | 1/2015 | Kwak et al. | |
| 2015/0162639 A1 | 6/2015 | Lee | |
| 2017/0190264 A1 | 7/2017 | Kim et al. | |
| 2020/0251699 A1 | 8/2020 | Omura | |

FOREIGN PATENT DOCUMENTS

| | | |
|---|---|---|
| JP | 2013-524406 A | 6/2013 |
| JP | 2013-171794 A | 9/2013 |
| JP | 2016-219185 A | 12/2016 |
| JP | 2017-157274 A | 9/2017 |
| KR | 10-2012-0096886 A | 8/2012 |
| KR | 10-2015-0057363 A | 5/2015 |
| KR | 10-2015-0067453 A | 6/2015 |
| KR | 10-2016-0149099 A | 12/2016 |
| KR | 10-2017-0030954 A | 3/2017 |
| KR | 10-2017-0035218 A | 3/2017 |
| KR | 10-2017-0051000 A | 5/2017 |
| KR | 10-2017-0082041 A | 7/2017 |
| WO | WO 2018/159275 A1 | 9/2018 |

OTHER PUBLICATIONS

Extended European Search Report, dated Oct. 14, 2020, for European Application No. 19738188.2.

* cited by examiner

BATTERY MODULE, AND BATTERY PACK AND VEHICLE COMPRISING SAME

TECHNICAL FIELD

The present disclosure relates to a battery module, and a battery pack and a vehicle including the battery module.

The present application claims priority to Korean Patent Application No. 10-2018-0004408 filed on Jan. 12, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

The conventional battery module generally includes a plurality of battery cells and a module case for packaging the plurality of battery cells. Here, buffer pads are respectively inserted between the plurality of battery cells of the conventional battery module to control volume change caused by cell swelling.

However, if the battery module includes the buffer pads respectively disposed between the plurality of battery cells, the energy density of the entire battery module is reduced due to the space loss caused by the plurality of buffer pads in the module case. Also, if vibration or impact occurs, the battery module is mechanically weak due to the relative motion of the battery cells inside the module case.

To solve this problem, the conventional battery module tends to adopt a high-rigidity pressing plate that presses the battery cells at both ends of the plurality of battery cells instead of the plurality of buffer pads.

If the pressing plate is adopted, the space occupied by the battery cells in the entire battery module may be relatively increased, and the relative motion of the battery cells inside the battery module may be reduced.

In the pressing plate structure, the bending portion of the module cover covering the pressing plate and the battery cells is bonded by means of welding or the like, and it is important to secure the bonding strength between these components.

The conventional module cover is bent at both ends for bonding with pressing plates. However, if deviation occurs due to a bending angle, defective joining such as non-uniform bonding with the pressing plate may be generated. Since bending deviations are highly likely to occur to some extent during the bending process, it is needed to find a way of satisfying a desired bonding strength by securing the uniform bonding quality even though the bending portion of the module cover which is to be welded is not bent uniformly.

DISCLOSURE

Technical Problem

The present disclosure is directed to providing a battery module, which may secure uniform bonding quality when a module cover and a pressing plate are bonded to each other, and a battery pack and a vehicle including the battery module.

Technical Solution

In one aspect of the present disclosure, there is provided a battery module, comprising: at least one battery cell; a pair of pressing plates disposed at both side surfaces of the at least one battery cell; and a module cover coupled to the pair of pressing plates to cover an upper side and a lower side of the at least one battery cell, wherein both ends of the module cover are bent to cover an upper end and a lower end of the pair of pressing plates, are welded to the pair of pressing plates, and include a plurality of auxiliary welding beads spaced apart from each other by a predetermined distance along a longitudinal direction of the module cover.

A plurality of welding portions for welding with the pair of pressing plates after the bending may be provided at both ends of the module cover, and the plurality of auxiliary welding beads may be disposed between the plurality of welding portions, respectively.

The plurality of auxiliary welding beads may be disposed to be stepped from the plurality of welding portions.

The plurality of auxiliary welding beads may have a concave groove shape of a predetermined size.

Welding may be performed at the plurality of welding portions when both ends of the module cover are bent so that both ends of the module cover are disposed in parallel to the pair of pressing plates, and welding may be performed at the plurality of auxiliary welding beads when both ends of the module cover are bent so that both ends of the module cover are inclined at a predetermined angle out of the pair of pressing plates.

The pair of pressing plates may have cover placing portions on which both bent ends of the module cover are placed.

The plurality of auxiliary welding beads may be disposed to have a multi-stage bead-shaped structure with the plurality of welding portions so as to cover a bending angle deviation caused by the bending.

In addition, the present disclosure provides a battery pack, comprising: at least one battery module according to the former embodiments; and a pack case configured to package the at least one battery module.

Moreover, the present disclosure provides a vehicle, comprising at least one battery pack according to the above embodiments.

Advantageous Effects

According to various embodiments as above, it is possible to provide a battery module, which may secure uniform bonding quality when a module cover and a pressing plate are bonded to each other, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
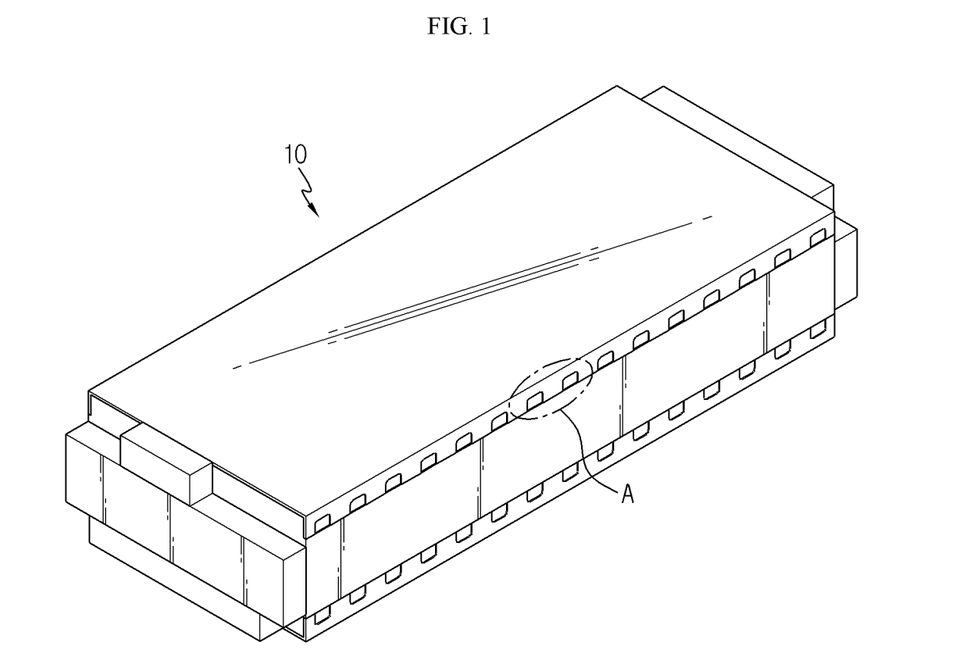
FIG. 1 is a diagram for illustrating a battery module according to an embodiment of the present disclosure.
Figure 2:
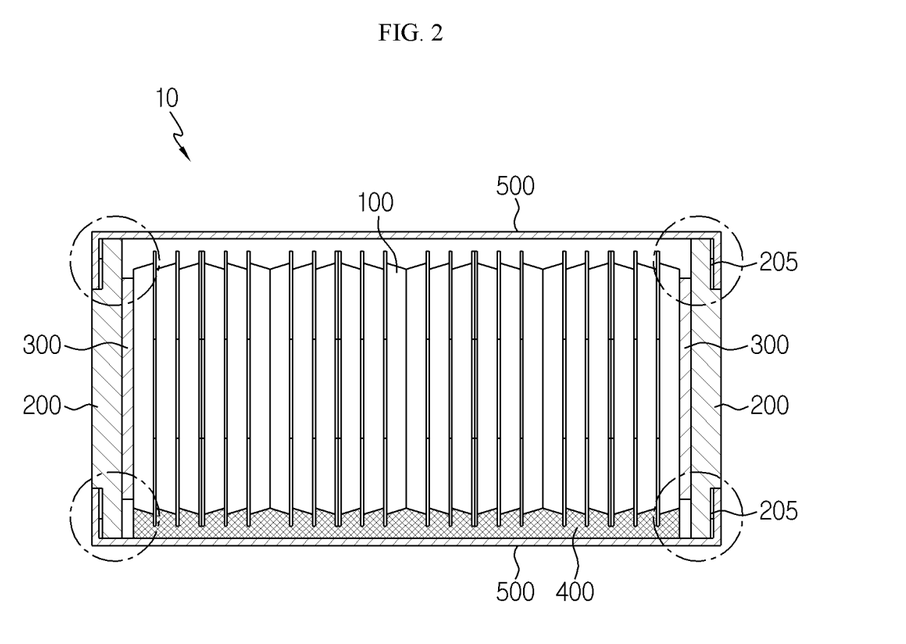
FIG. 2 is a cross-sectioned view showing the battery module of FIG. 1.
Figure 3:
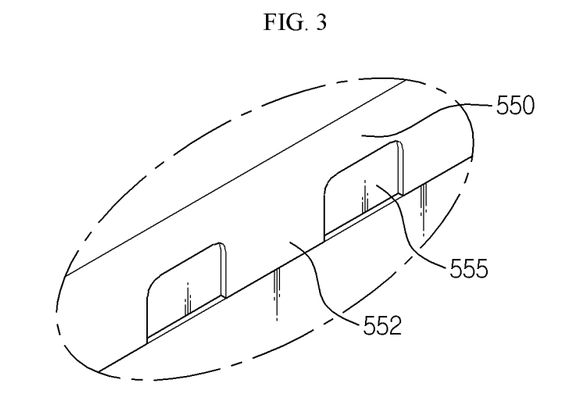
FIG. 3 is a diagram for illustrating a main part of the battery module of FIG. 1.

FIG. 1 is a diagram for illustrating a battery module according to an embodiment of the present disclosure, FIG. 2 is a cross-sectioned view showing the battery module of FIG. 1, and FIG. 3 is a diagram for illustrating a main part A of the battery module of FIG. 1.

Referring to FIGS. 1 to 3, a battery module 10 may include a battery cell 100, a pressing plate 200, a protection pad 300, a heatsink 400, and a module cover 500.

The battery cell 100 may be a secondary battery, selected from a pouch-type secondary battery, a cylindrical secondary battery or a rectangular secondary battery. Hereinafter, in this embodiment, the battery cell 100 will be explained as a pouch-type secondary battery.

At least one battery cell 100 or a plurality of battery cells 100 may be provided. This embodiment will be described based on the case where a plurality of the battery cells 100 are provided.

The pressing plate 200 is provided in a pair and may be disposed at both side surfaces of the at least one battery cell 100, or the plurality of battery cells 100 in this embodiment, to press the plurality of battery cells 100.

In this embodiment, the cell swelling of the plurality of battery cells 100 may be controlled by means of the pair of pressing plates 200. Accordingly, the buffer pads respectively provided between the battery cells 100 in the prior art may be excluded, thereby increasing the total energy density of the battery module 100.

The pair of pressing plates 200 may have cover placing portions 205.

The cover placing portions 205 are provided at an upper side and a lower side of each pressing plate 200, and both ends 550 of the module cover 500, which are to be bent as explained later, may be placed on the cover placing portions 205. To this end, the cover placing portion 205 may have a shape corresponding to both bent ends 550 of the module cover 500, explained later.

The protection pad 300 may be provided in a pair, and the pair of protection pads 300 may be disposed between the pressing plate 200 and the battery cell 100, which faces the pressing plate 200, among the plurality of battery cells 100.

The protection pad 300 may prevent the battery cell 100 facing the pressing plate 200 from being damaged due to direct contact with the pressing plate 200 when the battery cells 100 are pressed by the pressing plate 200. Also, the protection pad 300 may buffer an impact transferred from the pressing plate 200 when an external impact or the like occurs.

The heatsink 400 is used for cooling the plurality of battery cells 100 and may be disposed at a bottom portion of the plurality of battery cells 100. The heatsink 400 may have an air-cooled or water-cooled structure and may be made of a material with high heat transfer efficiency.

The module cover 500 is coupled to the pair of pressing plates 200 and may cover the upper side and the lower side of the at least one battery cell 100, or the plurality of battery cells 100 in this embodiment. The module cover 500 may be coupled to the pair of pressing plates 200 to package the plurality of battery cells 100.

Both ends 550 of the module cover 500 may be bent for coupling with the pair of pressing plates 200. Specifically, both ends 550 of the module cover 500 may be bent along a vertical direction to cover the upper end and the lower end of the pair of pressing plates 200, be placed on the cover placing portions 205 of the pair of pressing plates 200, and then be fixed to the pair of pressing plates 200 through welding. That is, both ends 550 of the module cover 500 may be adhered and fixed to the pair of pressing plates 200 by welding.

For this welding, a plurality of welding portions 552 may be provided at both ends 550 of the module cover 500. The plurality of welding portions 552 may be formed on the surfaces of both ends 550 of the module cover 500 and may be main welding points where welding is performed with the pair of pressing plates 200 after both ends 550 of the module cover 500 are bent.

A plurality of auxiliary welding beads 555 may be provided at both ends 550 of the module cover 500.

The plurality of auxiliary welding beads 555 may be spaced apart from each other by a predetermined distance along the longitudinal direction of the module cover 500 at both ends of the module cover 500. The plurality of auxiliary welding beads 555 may be disposed between the plurality of welding portions 552, respectively. That is, the plurality of auxiliary welding beads 555 may be alternately arranged with the plurality of welding portions 552.

The plurality of auxiliary welding beads 555 may be disposed to be stepped from the plurality of welding portions 552. Specifically, the plurality of auxiliary welding beads 555 may have a concave groove shape of a predetermined size. In other words, the plurality of auxiliary welding beads 555 may be arranged to have a multi-stage bead-shaped structure with the plurality of welding portions 552. The multi-stage bead-shaped structure may prevent the deterioration of the welding quality by covering the bending angle deviation even though the deviation occurs due to the bending forming angle, namely even though bending angle deviation occurs.

Accordingly, the plurality of auxiliary welding beads 555 may have a smaller thickness than the plurality of welding portions 552 at both ends 550 of the module cover 500.

Hereinafter, the welding process of the module cover 500 according to this embodiment will be described in more detail.

Figure 4:
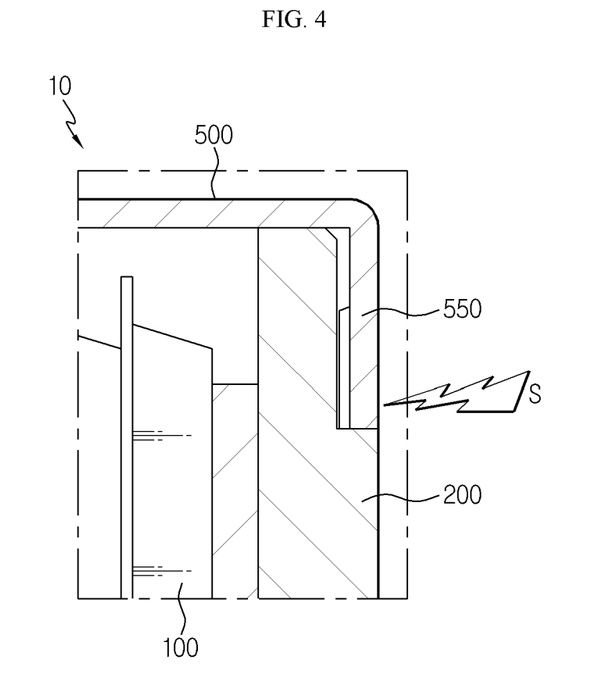
FIGS. 4 to 7 are diagrams for illustrating a welding process of a module cover of the battery module of FIG. 1.
Figure 5:
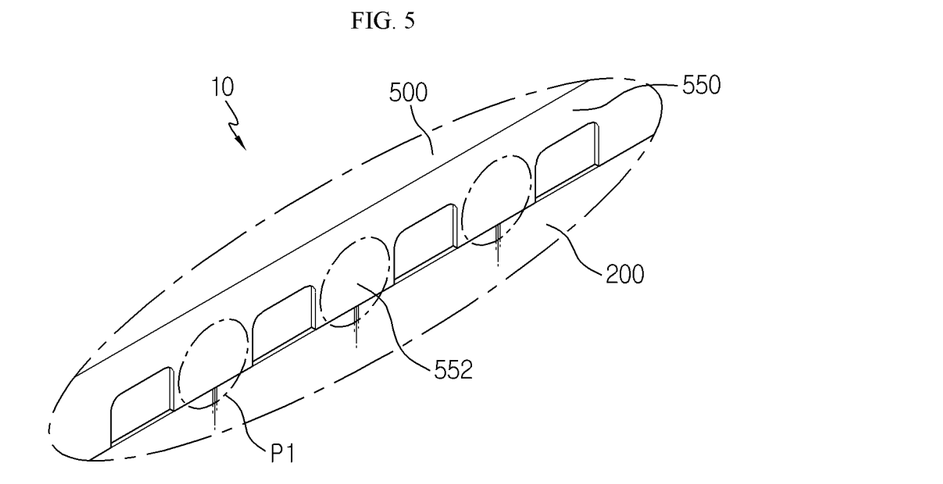
Figure 6:
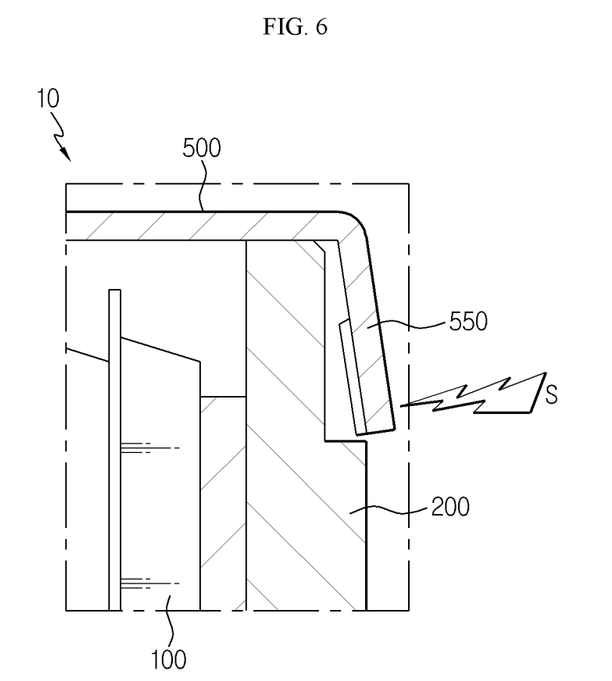
Figure 7:
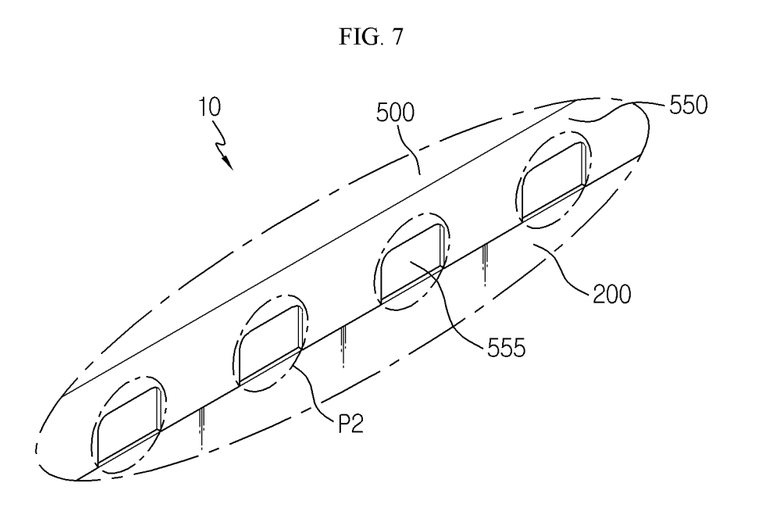

FIGS. 4 to 7 are diagrams for illustrating a welding process of a module cover of the battery module of FIG. 1. For example, FIGS. 5 and 7 are diagrams for illustrating a main part A of the battery module of FIG. 1, and FIGS. 4 and 6 are diagrams for illustrating circled areas of the battery module of FIG. 2.

Referring to FIGS. 4 and 5, as both ends 550 of the module cover 500 are bent, both ends 550 of the module cover 500 may be disposed in parallel to the pair of pressing plates 200.

When both ends 550 of the module cover 500 are vertically bent to be disposed in parallel to the pair of pressing plates 200, namely when there is no bias in the dimension and flatness of both bent ends 550, the welding S may be performed at main welding points P1 at which the plurality of welding portions 552 are disposed.

Referring to FIGS. 6 and 7, as both ends 550 of the module cover 500 are bent, both ends 550 of the module cover 500 may be disposed to be inclined at a predetermined angle out of the pair of pressing plates 200.

When both ends 550 of the module cover 500 are bent to be inclined at a predetermined angle other than a right angle to form an angle with the pair of pressing plates 200, namely when there is a bias in the dimension and flatness of both bent ends 550, if the welding S is performed at the plurality of welding portions 552, the risk of welding failure caused by non-uniform welding quality due to the step by the bias may be increased.

In this embodiment, if there is a bias in the dimension and flatness as both ends 550 of the module cover 500 are bent, the welding S may be performed not at the main welding points P1 (see FIG. 5) of the plurality of welding portions 552 but at auxiliary welding points P2 where the auxiliary welding beads 555 are disposed.

In this case, since the auxiliary welding beads 555 having a relatively smaller thickness than the welding portions 552 may compensate the step caused by the inclination, it is possible to greatly reduce the risk of welding defect such as non-uniform welding quality when the welding S is performed.

Accordingly, in this embodiment, even though a bending deviation occurs according to the bending angle of both ends 550 of the module cover 500, both ends 550 of the module cover 500 and the bonding portions of the pressing plate 200 may be uniformly bonded to each other by means of the auxiliary welding beads 555.

Moreover, in this embodiment, by means of the auxiliary welding beads 555, it is possible to effectively prevent the bonding strength from being lowered due to the bending deviation.

Figure 8:
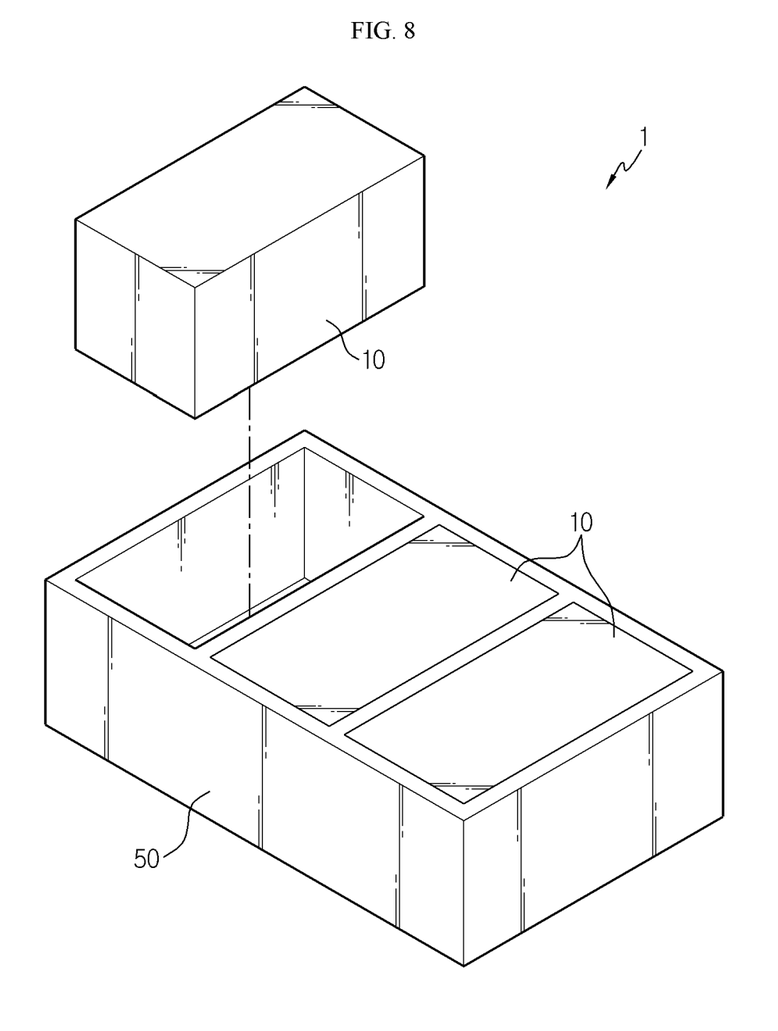
FIG. 8 is a diagram for illustrating a battery pack according to an embodiment of the present disclosure.

FIG. 8 is a diagram for illustrating a battery pack according to an embodiment of the present disclosure.

Referring to FIG. 8, a battery pack 1 may include at least one battery module 10 according to the former embodiment and a pack case 50 for packaging the at least one battery module 10.

The battery pack 1 may be provided to a vehicle as a power source of the vehicle. As an example, the battery pack 1 may be provided to an electric vehicle, a hybrid electric vehicle, or any other vehicle that may use the battery pack 1 as a power source. In addition, the battery pack 1 may be provided to other devices, instruments, equipment or the like such as an energy storage system using a secondary battery as well as the vehicle.

The devices, instruments and equipment such as the battery pack 1 and the vehicle according to this embodiment include the battery module 10 described above. Thus, it is possible to implement the battery pack 1 as well as the devices, instruments and equipment such as the vehicle including the battery pack 1, which has all of the advantages of the battery module 10 described above.

According to various embodiments as above, it is possible to provide a battery module 10, which may secure uniform bonding quality when a module cover 500 and a pressing plate 200 are bonded to each other, and a battery pack 1 and a vehicle including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   at least one battery cell;
   a pair of pressing plates respectively disposed at opposite side surfaces of the at least one battery cell; and
   a module cover coupled to the pair of pressing plates to cover an upper side and a lower side of the at least one battery cell,
   wherein opposite ends of the module cover are bent by a bending to cover an upper end and a lower end of the pair of pressing plates, are welded to the pair of pressing plates by a plurality of welding portions, and include a plurality of auxiliary welding beads spaced apart from each other by a predetermined distance along a longitudinal direction of the module cover, and
   wherein the plurality of auxiliary welding beads have a smaller thickness than the plurality of welding portions at the opposite ends of the module cover.

2. The battery module according to claim 1, wherein the plurality of welding portions for welding with the pair of pressing plates after the bending are provided at the opposite ends of the module cover, and
   wherein the plurality of auxiliary welding beads are disposed between the plurality of welding portions, respectively.

3. The battery module according to claim 2, wherein the plurality of auxiliary welding beads are disposed to be stepped from the plurality of welding portions.

4. The battery module according to claim 2, wherein the plurality of auxiliary welding beads have a concave groove shape of a predetermined size.

5. The battery module according to claim 2, wherein welding is performed at the plurality of welding portions when the opposite ends of the module cover are bent so that the opposite ends of the module cover are disposed in parallel to the pair of pressing plates, and wherein welding is performed at the plurality of auxiliary welding beads when the opposite ends of the module cover are bent so that the opposite ends of the module cover are inclined at a predetermined angle out of the pair of pressing plates.

6. The battery module according to claim 1, wherein the pair of pressing plates have cover placing portions on which the bent opposite ends of the module cover are placed.

7. The battery module according to claim 2, wherein the plurality of auxiliary welding beads are disposed to have a multi-stage bead-shaped structure with the plurality of welding portions so as to cover a bending angle deviation caused by the bending.

8. A battery pack, comprising:

at least one battery module defined in claim 1; and a pack case configured to package the at least one battery module.

9. A vehicle, comprising at least one battery pack defined in claim 8.

10. A battery module, comprising:

at least one battery cell;

a pair of pressing plates respectively disposed at opposite side surfaces of the at least one battery cell; and a module cover coupled to the pair of pressing plates to cover an upper side and a lower side of the at least one battery cell, wherein opposite ends of the module cover are bent by a bending to cover an upper end and a lower end of the pair of pressing plates, are welded to the pair of pressing plates, and include a plurality of auxiliary welding beads spaced apart from each other by a predetermined distance along a longitudinal direction of the module cover, wherein a plurality of welding portions for welding with the pair of pressing plates after the bending are provided at the opposite ends of the module cover, wherein the plurality of auxiliary welding beads are disposed between the plurality of welding portions, respectively, and wherein the plurality of auxiliary welding beads are disposed to be stepped from the plurality of welding portions.

11. A battery module, comprising:

at least one battery cell;

a pair of pressing plates respectively disposed at opposite side surfaces of the at least one battery cell; and a module cover coupled to the pair of pressing plates to cover an upper side and a lower side of the at least one battery cell, wherein opposite ends of the module cover are bent by a bending to cover an upper end and a lower end of the pair of pressing plates, are welded to the pair of pressing plates, and include a plurality of auxiliary welding beads spaced apart from each other by a predetermined distance along a longitudinal direction of the module cover, wherein a plurality of welding portions for welding with the pair of pressing plates after the bending are provided at the opposite ends of the module cover, wherein the plurality of auxiliary welding beads are disposed between the plurality of welding portions, respectively, and wherein the plurality of auxiliary welding beads are disposed to have a multi-stage bead-shaped structure with the plurality of welding portions so as to cover a bending angle deviation caused by the bending.

* * * * *